Jan. 11, 1927.  W. J. SHACKELTON  1,613,964
TESTING SYSTEM
Filed July 25, 1923
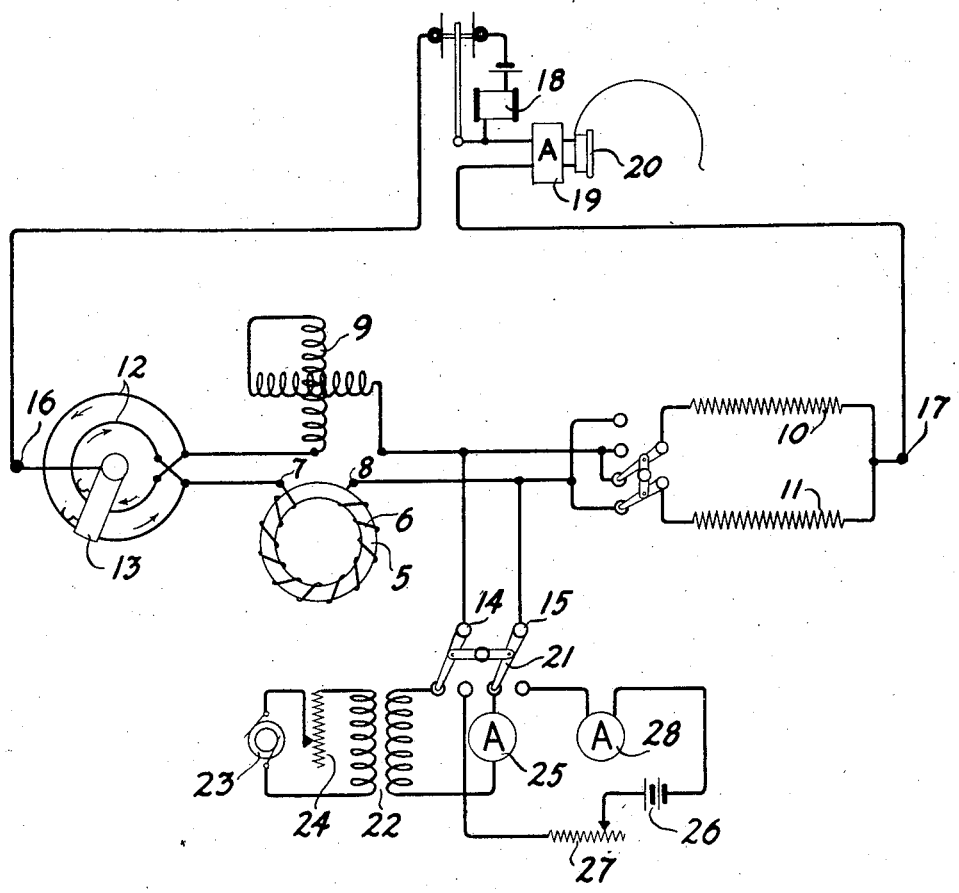
Inventor
William J. Shackelton
by *[signature]* Atty.

Patented Jan. 11, 1927.

1,613,964

UNITED STATES PATENT OFFICE.

WILLIAM J. SHACKELTON, OF SCOTCH PLAINS, NEW JERSEY, ASSIGNOR TO WESTERN ELECTRIC COMPANY, INCORPORATED, OF NEW YORK, N. Y., A CORPORATION OF NEW YORK.

TESTING SYSTEM.

Application filed July 25, 1923. Serial No. 653,666.

This invention relates to testing systems.

An object of this invention is to provide means and methods for accurately determining the electrical characteristics of magnetic members.

It is frequently desirable to determine certain electrical characteristics of a magnetic member, such as the core for a loading coil or transformer prior to placing the permanent windings upon the core. If the core does not come up to a certain standard it can be discarded without the expense of completing the assembly of the coil. The form of this invention hereinafter described in detail provides an arrangement for quickly and accurately determining the electrical characteristics of a magnetic member capable of use in the commercial production of magnetic devices as a regular inspection test. In order to determine, for example, the alternating current losses in an iron dust core, this invention employs suitable means for applying an effective winding around the core of a plurality of turns, and this winding is used as an arm of a Wheatstone bridge network. Means are provided for taking two consecutive bridge balances, one with direct current and the other with alternating current of the desired frequency and strength, care being taken to maintain the four arms of the bridge unchanged for the two balances. The difference between the two balances will be a true measure of the alternating current loss of the core since the process eliminates the effect of any changes in the direct current resistance of the circuit due to the operation of the contacts which close the windings around the core under test or variable contacts in the other part of the Wheatstone bridge circuit. The accuracy in determining the direct current balance of the bridge will be increased by including an interrupter in the leads containing the unbalance current whereby the interrupted direct current may be amplified by a vacuum tube amplifier and impressed upon the telephone receiver in amplified form. The same receiver and amplifier may also be utilized for obtaining the alternating current balance.

The drawing illustrates an embodiment of this invention of particular utility in determining the alternating current loss in iron cores for transformers and loading coils or other inductance devices.

The core 5 under test is provided with a multi-turn winding. This may be done in any suitable manner. One arrangement which may be employed for readily placing a winding of a plurality of turns around the core is by means of the special fixture described and claimed in United States patent to J. L. Crouch, 1,570,948 dated January 26, 1926, to which reference is made for a detailed disclosure. This fixture requires that each effective turn of the winding around the core have two points at which contact is made and broken every time a new core is tested. The testing arrangement provided in accordance with the present invention, however, eliminates any inaccuracy that might be produced by the use of such a fixture due to the variation of the direct current resistance of this large number of contacts.

After the winding 6 has been applied to the core member, the terminals 7 and 8 of the winding are connected in a Wheatstone bridge circuit as one arm thereof, a second arm comprising an inductometer 9, a third arm comprising a resistance 10, and a fourth arm, a resistance 11. The bridge may be balanced by a pair of potentiometer wires 12, which may be by means of a suitable switch arm included in circuit with the inductometer 9 or in circuit with the winding 6.

The terminals 14 and 15 for supplying current to the bridge are connected, one to the common terminal of inductometer 9 and resistance 10, the other being connected to the common terminal of resistance 11 and winding 6. The other two bridge points 16 and 17 are connected through a self interrupter to the input circuit of a suitable amplifier 19, the output circuit of which is coupled to a telephone receiver 20.

As described above, the alternating current loss of the core 5 may be determined by making consecutive alternating and direct current balances of the bridge circuit after each closure of the test fixture which forms the winding around the core, thereby eliminating the effect of any changes in the direct current resistance of the circuit due to the operation of the fixture contacts or other movable contacts included in the four arms of the Wheatstone bridge.

Switch arm 21 enables the current supply terminals 14 and 15 to be connected in one position to the secondary winding of a transformer 22, the primary winding of which is connected to a suitable alternating current source 23, the frequency of which is that at which it is desired to ascertain the alternating current loss in the core 5. The strength of the alternating current delivered by the source 23 may be varied by an adjustable resistance 24 until the reading on the ammeter 25 indicates that the desired current is being delivered to the bridge circuit. With the switch connected to source 23, the bridge may be balanced by the movement of the switch arm 13 and the variation of the inductometer 9 until no sound is heard in the telephone receiver 20. The switch arm 21 is then thrown to its second position, which serves to connect the current supply to terminals 14 and 15 to a suitable source 26 of direct current, the intensity of which may be varied by an adjustable resistance 27 until the reading obtained by ammeter 28 indicates that the direct current delivered is of the proper value.

In order that the telephone receiver 20 may be employed for obtaining a direct current balance of the bridge, a self-interrupting relay 18 may be included in the leads from the terminals 16 and 17, whereby the unbalance current may be converted into a pulsating current, which may be amplified by the amplifier 19 in the same manner as the alternating current was amplified, whereby the unbalance direct current will produce an audible tone in the receiver. The switch arm 13 may then be adjusted to a second position with the direct current applied until no tone is heard in the receiver 20. Assuming that the resistance wires 12 are suitably calibrated, the difference between the two readings obtained by the consecutive use of alternating current and direct current will be a true value of the alternating current loss in the core 5.

The amplifier shown at point 19 for amplifying the unbalance currents may be of any desired type, such as the three-electrode vacuum tube amplifier now well known in the art.

Since the quantity to be measured by the testing arrangement of this invention is very small, namely of the order of .002 ohms for a 30 turn winding on the core for 900 cycles, it will generally be preferable to make noninductive the adjustable resistance employed in balancing the Wheatstone bridge circuit. This absence of inductance from the adjustable resistance may be accomplished as shown in the drawing by connecting the two strips 12, in parallel, but in such a manner that the current flows in opposite directions in the two strips. In order to insure the approximate equality of currents in the two strips, their widths may be made proportional to the diameters of their respective circles.

It is to be particularly noted that the testing arrangement described above permits the alternating current loss to be measured by the taking of two consecutive balances of the bridge, care being taken that the two readings are taken without the movement of any of the contacts, which would tend to affect the balance point of the bridge.

It is, of course, to be understood that this invention is not limited in its application to the measurement of alternating current losses in core material, but is capable of being employed in the investigation of various electrical characteristics of magnetic material, such for example, as the study of permeability and iron losses with respect to temperature and magnetization variations.

The invention claimed is:

1. The method of determining the alternating current loss in a magnetic member which comprises forming a temporary winding around said member, utilizing said winding as a portion of a bridge network, and obtaining consecutive balances of said bridge for both alternating current and direct current while maintaining unchanged the connections of said temporary winding.

2. The method of determining the alternating current loss in a magnetic member which comprises forming a temporary winding around said member, utilizing said winding as an arm of a Wheatstone bridge network, supplying alternating current to one set of terminals of said bridge, amplifying and impressing upon a telephone receiver the unbalance alternating current obtained from the other set of terminals of the bridge, subsequently impressing direct current upon said first set of terminals, interrupting the direct current unbalance from said other set of terminals, amplifying said interrupted current, and impressing the amplified interrupted current upon a telephone receiver.

3. Apparatus for testing a magnetic core member comprising a winding around the core, a Wheatstone bridge network, one arm of which comprises said winding, current supply terminals for said bridge, means for connecting alternating current to said terminals, means for supplying direct current to said terminals, and means for determining the balance of said bridge under both conditions.

4. Apparatus for testing a member of magnetic material comprising a winding around said member, a Wheatstone bridge network, one arm of which comprises said winding, current supply terminals for said bridge, means for connecting an alternating current source to said terminals, means for supplying direct current to said terminals, and means for determining the balance of said bridge under both conditions, said last means comprising means for continuously interrupting the direct current unbalance current from said bridge.

5. Apparatus for testing a magnetic core member comprising a winding around said core, a Wheatstone bridge network, one arm of which comprises said winding, current supply terminals for said bridge, a source of alternating current, a source of direct current, means for alternately connecting said sources to said terminals, a second set of terminals for leading off unbalance current from said bridge, an amplifier having its input circuit connected to said second set of terminals, a telephone receiver connected to the output circuit of said amplifier, and means for continuously interrupting the direct current unbalance current from said bridge.

In witness whereof, I hereunto subscribe my name this 18th day of July, A. D. 1923.

WILLIAM J. SHACKELTON.